United States Patent
Semwal et al.

(10) Patent No.: US 11,706,142 B2
(45) Date of Patent: Jul. 18, 2023

(54) MULTIHOMING OPTIMIZATIONS FOR FAST FAILOVER IN SINGLE-ACTIVE NETWORKS

(71) Applicant: Arista Networks, Inc., Santa Clara, CA (US)

(72) Inventors: Rajesh Kumar Semwal, Sunnyvale, CA (US); Amit Dattatray Ranpise, San Jose, CA (US)

(73) Assignee: ARISTA NETWORKS, INC, Santa Clara, CA (US)

( * ) Notice: Subject to any disclaimer, the term of this patent is extended or adjusted under 35 U.S.C. 154(b) by 0 days.

(21) Appl. No.: 17/825,929

(22) Filed: May 26, 2022

(65) Prior Publication Data

US 2022/0286397 A1 Sep. 8, 2022

Related U.S. Application Data

(63) Continuation of application No. 16/883,154, filed on May 26, 2020, now Pat. No. 11,349,758.

(51) Int. Cl.
*H04L 45/745* (2022.01)
*H04L 12/46* (2006.01)

(52) U.S. Cl.
CPC ........ *H04L 45/745* (2013.01); *H04L 12/4641* (2013.01)

(58) Field of Classification Search
CPC . H04L 45/745; H04L 12/4641; H04L 45/742; H04L 45/00
See application file for complete search history.

(56) References Cited

U.S. PATENT DOCUMENTS

| | | | |
|---|---|---|---|
| 9,019,814 B1* | 4/2015 | Mohanty | H04L 41/08 370/219 |
| 9,628,409 B1* | 4/2017 | Yuvaraj | H04L 49/201 |
| 10,333,836 B2* | 6/2019 | Manthiramoorthy | H04L 12/4641 |
| 10,757,017 B2* | 8/2020 | Kanjariya | H04L 45/021 |
| 2017/0250904 A1* | 8/2017 | Singarayan | H04L 12/4641 |
| 2018/0302321 A1* | 10/2018 | Manthiramoorthy | H04L 12/4641 |
| 2019/0229937 A1* | 7/2019 | Nagarajan | H04L 12/18 |
| 2021/0377172 A1 | 12/2021 | Semwal et al. | |

OTHER PUBLICATIONS

Sajassi et al., RFC 7432 BGP MPLS-Based Ethernet VPN, Feb. 2015 (56 pages).

* cited by examiner

*Primary Examiner* — Afshawn M Towfighi
(74) *Attorney, Agent, or Firm* — Fountainhead Law Group P.C.

(57) ABSTRACT

Techniques described herein provide for fast updating of a forwarding table in a single active multihoming configuration. A first network device that is not connected to an ethernet segment (ES), receives a plurality of ethernet segment (ES) routes (e.g., EVPN type-4 routes) from a plurality of network devices that are connected to a host via the ES. When connectivity is lost to the on a designated forwarded for the ES, t the first network device performed a designated forwarding election algorithm based on the plurality of the received ES routes, to identify that a second network device of the plurality of network devices is designated as a new forwarding device. The first network device modifies an entry in a forwarding table to indicate that the host is now reachable via the second network device.

20 Claims, 5 Drawing Sheets

MULTIHOMING OPTIMIZATIONS FOR FAST FAILOVER IN SINGLE-ACTIVE NETWORKS

CROSS-REFERENCE TO RELATED APPLICATIONS

This application is a continuation of U.S. patent application Ser. No. 16/883,154, filed May 26, 2020, the content of which is incorporated hereby by reference in its entirety for all purposes.

BACKGROUND

The present disclosure relates to optimization of network routing for systems that include devices that provide multihoming in the Ethernet Virtual Private Network (EVPN) environment. In particular, multihoming redundant devices for an ethernet segment may store backup paths in a forwarding table for immediate use in case of ethernet segment link interruption.

SUMMARY

In some computer networks, network devices (e.g., routers, switches, etc.) are configured in multihoming topologies, where two or more network devices provide an active redundant connection to the same host. In an ethernet virtual private network (EVPN), the various direct connections between a multihomed host and the redundant network devices (e.g., Provider Edge devices) are referred to as an ethernet segment (ES) and is assigned an ethernet segment identifier (ESI).

The redundant network devices may be configured in an 'all-active' configuration or a 'single-active' configuration. In the 'all-active' configuration any one of the redundant network devices may send and receive traffic in for the ES in its EVPN Instance (EVI). On the other hand, in 'single-active' active configuration, only a single redundant network device (that is marked as 'active') is allowed to send and receive traffic in ES in its EVI. The 'active' redundant device is selected using a deterministic Designated Forwarder (DF) election algorithm that may be performed in the EVI (e.g., cooperatively by the redundant network devices). The DF election algorithm may use as, an input, all received Ethernet ES routes (e.g., type-4 EVPN routes) for a particular ES. The DF election algorithm designates a single redundant network device as the 'active' device, and all other redundant network device as 'standby' devices.

When several redundant network devices in a 'single-active' configuration provide multihoming to a host, they will advertise EVPN auto discovery (AD) routes for the ES to remote network devices (e.g., Provider Edges) that are not connected to the ES of the redundant network devices. Using the data of the EVPN AD routes, the remote network device will learn that only one of the several redundant network devices is 'active.' When the 'active' redundant network device advertises an access to a host on its ES (e.g., using type-2 MAC/IP Advertisement Route) to the remote network device, that remote network device will configure its forwarding table to forward traffic to the host via the 'active' redundant network device (e.g., by setting the address of the 'active' redundant network device as 'active' in a nexthop group associated with the host).

If the currently 'active' redundant network device loses its connection to ES, it may withdraw the EVPN AD route advertisement from the remote network device. In some embodiments, if there were only two redundant network devices connected to the ES, the remote network device may immediately switch to using the other redundant network devices, when the 'active' redundant network device fails. For example, the remote network device may set the address of the second redundant network device as 'active' in a nexthop group associated with the host. This is possible because if one of the two redundant network device failed, there is only one option for which device will become the next Designated Forwarder.

However, if there were more than two redundant network devices connected to the ES, the remote device is unable to perform the quick switch because it has not information about which of the surviving devices will be the next Designated Forwarder after the failure of the 'active' redundant network device. Because of this, the remote device will have to purge its forwarding table of all the addresses learned on the ES, which will result in traffic disruption until the addresses are re-learnt. For example, after the DF election algorithm is re-run again by the surviving redundant network devices to identify the new DF, the new active redundant network device will re-advertise all addresses of the multihomed hosts to the remote host. Such an event will significantly slow down the network traffic.

To overcome this problem, techniques are presented for allowing the use of 'single-active' active configuration for large groups (e.g., groups with more than two devices) of redundant network devices for an ES without the loss of fast-switch over capability by a remote network device (e.g., a device not directly connected to the ES).

To solve the fast-switch problem, a remote network device may be configured to no longer reject ES routes (e.g., EVPN type-4 route) that are received for an ES that the remote network device is not connected to (as is the conventional practice). Instead, the remote network device is configured to store such ES routes for the remote ES it its local memory. If the remote network device becomes aware of a loss of a multihoming link by a currently 'active' device of a set of redundant networking devices that provide multihoming to host via that remote ES (e.g., when the remote device receive a withdrawal of EVPN AD route advertisement), the remote network device may use the data from the stored ES routes (e.g., EVPN type-4 route) to identify which of the surviving redundant networking devices, that are connected to a remote ES, will become designated as the next Designated Forwarder for that ES.

In particular, the remote network device may run its own instance of the DF election algorithm while the same DF election algorithm is performed by the surviving redundant networking devices. Because the DF election algorithm is deterministic, the remote devices and the surviving redundant networking devices will identify the same single redundant networking device as the next Designated Forwarder for that ES. Accordingly, when the loss of the ES link occurs at the currently 'active' redundant networking device, the remote network device is able to accurately predict the next 'active' redundant networking device of the ES it's not connected to.

Since the next 'active' redundant networking device is predicted, the remote network device may quickly adjust its forwarding table to indicate that the host multihomed on the ES is now reachable via the newly 'active' redundant networking device. For example, the remote network device may update the next hop group of each ES-connected host to indicate the address of the precited Designated Forwarder as 'active.'

As a result, the remote network device is able to, in an event of an interruption, of an ES link of the Designated Forwarder device, to quickly switch traffic forwarding to the correct one of the surviving redundant networking devices even when the redundant networking devices serving the same ES include more than two devices in a 'single-active' active configuration.

BRIEF DESCRIPTION OF THE DRAWINGS

Various objects and advantages of the disclosure will be apparent upon consideration of the following detailed description, taken in conjunction with the accompanying drawings, in which like reference characters refer to like parts throughout, and in which.

DETAILED DESCRIPTION

Figure 1A:
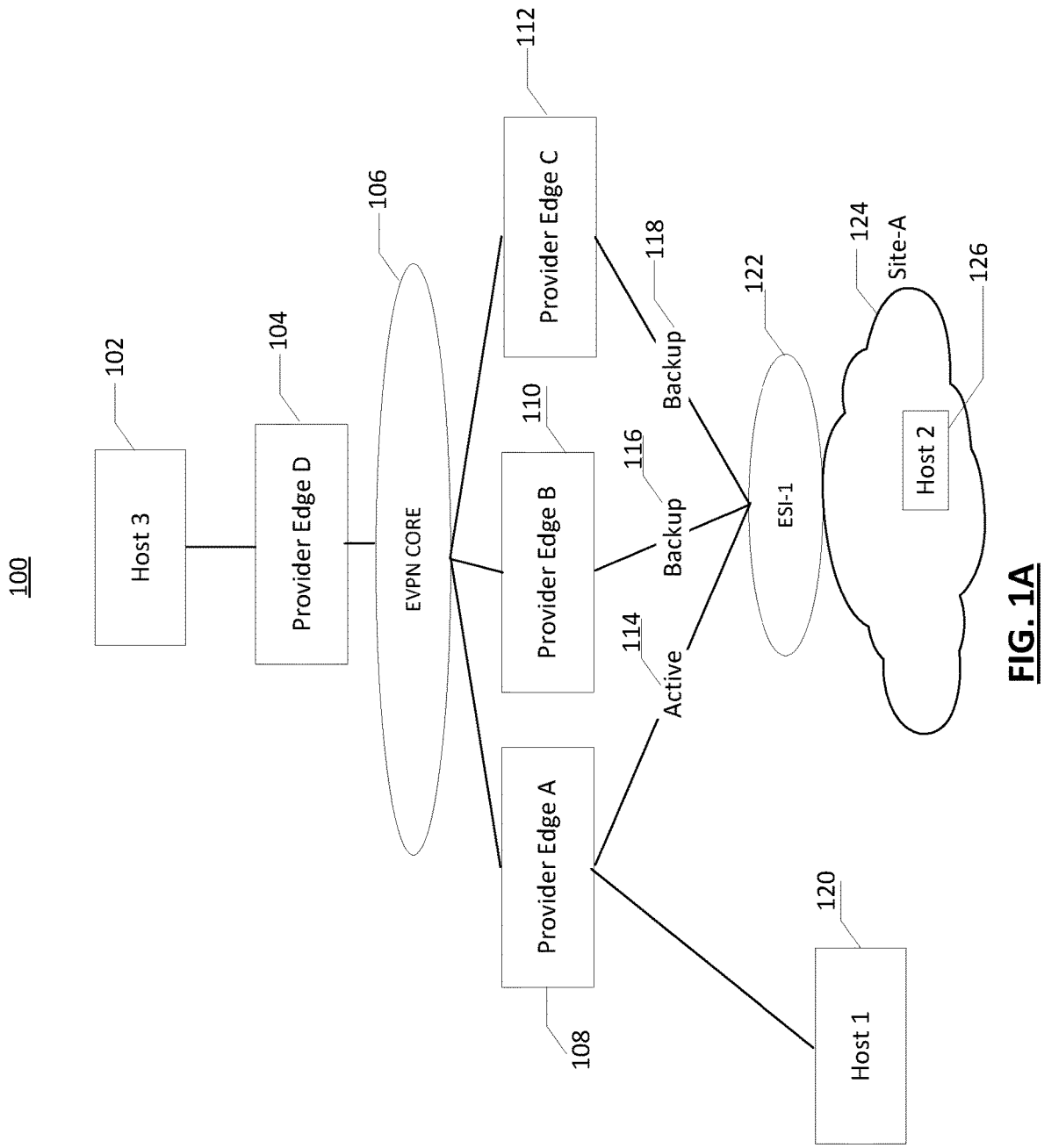
FIG. 1A shows an illustrative network topology of a system for optimizing routing in an EVPN environment, in accordance with some embodiments of the disclosure.

FIG. 1A shows an illustrative diagram of system 100 for optimizing forwarding tables (e.g., MAC tables) for routing traffic in an EVPN environment configured for devices (e.g., routers, switches, etc.) 102, 104, 108, 110, 112, 120, and 126. In some embodiments, links between devices 112, 110, 106, 108, 102, and 114 may be an overlay the virtual links configured over an underlay of physical devices. In some embodiments, provider edge devices 104, 108, 110, and 112 are connected via EVPN core 106. EVPN core 106 may be a system of devices that are configured to provide Ethernet multipoint services over MPLS (Multiprotocol Label Switching) networks that enable control-plane based MAC learning.

System 100 is shown as having several customer devices, e.g., customer edge (CE) devices: host 120, host 120, and host 126 (which may be a part of site 124). System 100 also has several provider edge (PE) devices. In the shown embodiment, the PE devices includes provider edges 104, 108, 110, 112. In some embodiments, each of the PE devices 104, 108, 110, 112 may be configured as Virtual Tunnel End Point (VTEP). As shown, host 126 is reachable via an Ethernet segment having Ethernet segment identifier (ESI) ESI-1. In some embodiments, other hosts (e.g., hosts 120 and 102) may be reachable with other ethernet segments with different ESIs. One skilled in the art would understand that the same techniques may be used by a system containing any number of provider edge devices servicing any number of host via any number of ethernet segments. In some embodiments, each of the hosts 102, 120, and 126 may be a hypervisor serving several virtual machines, each with its own Layer 2 address (e.g., MAC address).

In the shown embodiment, the system 100 is configured to include redundancy where Site-A 124 (e.g., that includes host 126) is being multihomed by a direct connection to both Provider Edges 108, 112, and 112 (e.g., acting as VTEPs) using ES links. In some embodiments, the ES links may be configured with ESI of ESI-1. In some embodiments (not shown), the multihoming configuration may be a multiple active multihoming connection, where all provider edges 108, 110, and 112 are eligible to receive traffic (e.g., network packets) from host 126 via ES 122 (e.g., using ESI-1 as an address). In that embodiment, all provider edges 108, 110, and 112 can also send or forward traffic (e.g., network packets) to host 126 via ES 122 (e.g., using ESI-1 as an address).

In the shown embodiment, provider edges 108, 110, and 112 operate in single-active configuration. In this configuration, only a single redundant network device of provider edges 108, 112, and 112 is marked as 'active' and is allowed to send and receive traffic in ES 122 in its EVI. In typical operation, provider edges 108, 110, and 112 exchanges type-4 EVPN routes for the ES 122. The information from the exchanged type-4 EVPN routes can be used to perform Designated Forwarder (DF) election algorithm by devices in the shared EVI (e.g., cooperatively or individually by provider edges 108, 112, and 112). As shown, DF election resulted in provider edge 108 being marked as active 114, and provider edges 110 and 112 being marked as backup 116, and 118.

Because multihoming of system 100 is configured in single-active configuration redundant network device provider edge 108 (which was selected by DF election as an active device) may advertise, to other network devices with which they maintain an EVPN session (e.g., provider Edge 104), a route (such as an type-2 MAC/IP Advertisement Route) for the ES 122 with identifier ESI-1.

When provider edge 104 receives an EVPN AD route from provider edge 108, provider edge 104 configures its forwarding table to forward traffic to host 126 via the 'active' redundant network device provider edge 108 (e.g., by setting the address of the 'active' redundant network device PE 108 as 'active' in a nexthop group associated with host 126). In this way, provider edge 104 will forward traffic to the host (e.g. from host 102) via the 'active' redundant network device PE 108. In some embodiments, provider edge 104 may also route traffic to host 120 (that is not connected via ESI 122) via provider edge 108.

Figure 1B:
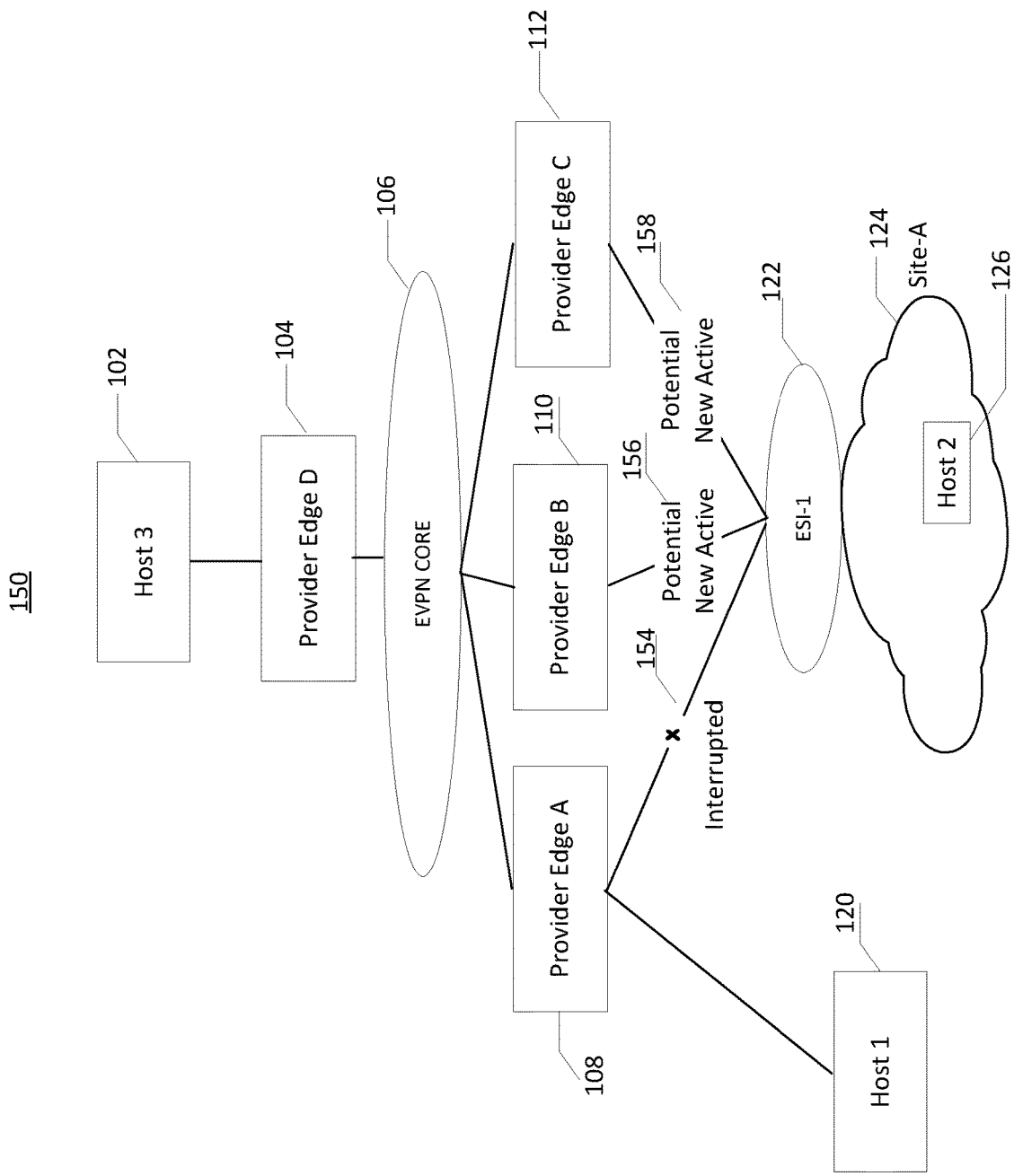
FIG. 1B shows another illustrative network topology of a system for optimizing routing in EVPN environment, in accordance with some embodiments of the disclosure.

FIG. 1B shows an illustrative diagram of system 150 for optimizing forwarding tables in an EVPN environment configured for devices (e.g., routers, switches, etc.) 102, 104, 108, 110, 112, 120, and 126. System 150 may have the same as devices and links as shown in system 100 of FIG. 1 1A except that a link between provider edge 108 and ES 22 is interrupted or down. Such an event will have wide implications in the network 150 and will affect traffic flows from host 102 to host 126 and from host 120 to host 126. While host 126 may still be reachable, a large amount of traffic may be affected by out of date forwarding tables (e.g., MAC tables).

In some embodiments, when provider edge 108 loses connectivity to ES 122, it may withdraw the EVPN AD route advertisement (e.g. for host 126) from provider edge 104. In situations where there are only two provider edges providing multihoming to host 126 (not shown), provider edge 104 would be able to immediately switch to routing traffic to host 126 via only remining provider edge with a known connection to host 126 (e.g. by setting the address of the reminding provider edge as 'active' in a nexthop group associated with host 126).

However, as shown, a single active multihoming is provided by more than two provider edges (e.g. PEs 110 and 112). For this reason, when link 154 become interrupted there may be two possible provider edges 110 and 112 that would become active when DF election algorithm is re-run. For example, provider edges 110 may become active 156, or provider edge 112 may become active 158. For this reason, in some configurations, provider edge 104 may be unable to ascertain which of the remaining provider edges 110, 112 is active to achieve a fast switch in the forwarding table.

In one approach, the system may simply not to use more than two redundant network devices in a single-active multihoming configuration. However, this limits the resiliency of the system 150, because less backup devices are available which means there is a higher risk of total failure and host 126 becoming unavailable. In another approach, when provider edge 108 loses connectivity to ES 122, it may revoke or withdraw the EVPN AD route advertisement (e.g. for host 126) from provider edge 104 which then results in provider edge 104 purging its forwarding table of all the addresses learned on ES 122, which will result in traffic disruption until the addresses are re-learnt. For example, after the DF election algorithm is re-run again by the surviving redundant network devices (provider edges 110 and 112) to identify the new DF, the new active redundant network device (e.g., provider edge 110) will re-advertise all addresses of the multihomed hosts (e.g., host 126) to provider edge 104. Such an event will significantly slow down the network traffic until all routes are re-learned.

To overcome this problem, techniques are presented for allowing the use of 'single-active' configuration for redundant network devices (e.g., PEs 108, 110, 112) for ES 122 without the loss of fast-switch over capability by a remote network device (e.g., PE 104 that is not directly connected to ES 122).

Typically, when a provider edge receives an ES route (i.e., an EVPN type-4 route) for an ES it is not connected to, such a route is rejected. For example, if PE 104 were to receive EVPN type-4 route for ES 122, such routes would be dropped. Instead, PE 104 may store all received EVPN type-4 route even if these routes are for ES 122 which it has no direct connection to. For example, PE 106 may maintain a special table in its local memory where foreign EVPN type-4 routes are stored (e.g., along with an identifier of the ES that these routes are for).

In this case, when PE 108 loses connectivity to ES 122, it can withdraw EVPN AD route advertisement from PE 104 as normal. However, PE 104 now has enough information to compete a fast switchover. In particular, PE 104 may use stored EVPN type-4 route for ES 122 to locally re-run the DF election algorithm and thus predict the outcome of the DF election algorithm that will be run by remaining redundant network devices connected to ES 122 (e.g., PEs 110 and 112. Because DF election algorithm is deterministic, PE 104 is thus able to consistently predict which of the PEs 110 and 112 will be designated as DF for ES 122. For example, PE 104 may determine that PE 110 is selected as the next DF. In this case, PE 104 quickly update it's forwarding table update the next hop group of each host (e.g., host 126) reachable by ES 122 to indicate the address of PE 110 as 'active'. Because PE 110 is indeed active, traffic to host 126 is not interrupted. In this way, 'single-active' active configuration is possible for multihoming groups having more than two PEs servicing the same ES.

Figure 2:
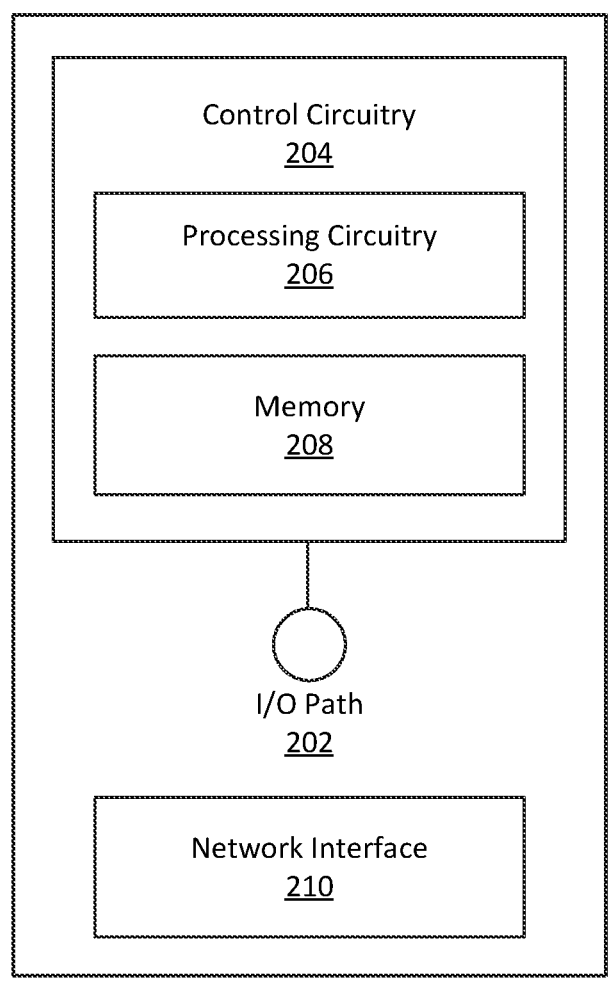
FIG. 2 shows a diagram of an illustrative network device for optimizing routing in EVPN environment, in accordance with some embodiments of the disclosure.

FIG. 2 shows a generalized embodiment of a network device usable in a system for optimized routing, in accordance with some embodiments of the disclosure. In particular, device 200 of FIG. 2 may be any of the devices depicted in FIGS. 1A and 1B (e.g., devices 102, 104, 1056, 108, 110, 112, 120, 124) or may be a physical or virtual device hosting any of physical or virtual devices 102, 104, 1056, 108, 110, 112, 120, 124. Device 200 may be a router, an L3 switch, an L2 router, or a host, and/or any other computing device that may be configured to participate in EVPN switching or routing. Device 200 may receive data via data network interfaces 210 and provide the received data to control circuitry 204 via an input/output (I/O) path 202. Control circuitry 204 includes processing circuitry 206 and storage 208. Storage 208 may include volatile memory 330 (such as random-access memory (RAM), for example, static RAM and/or dynamic RAM), which does not retain its contents when power is turned off, and non-volatile memory 208 (such as, for example, a solid state drive (SSD), a hard disk drive (HDD), electrically erasable programmable read-only memory (EEPROM), etc.), which does retain its contents when power is turned off. Control circuitry 204 may send and receive commands, requests, and other suitable data using I/O path 202. As noted above, I/O path 202 connects control circuitry 204 (and specifically processing circuitry 206) to network interface 210, which in turn connects device 200 to one or more other devices. For example, I/O path 202 may provide route packets to next hops listed in a forwarding table.

Control circuitry 204 may be based on any suitable processing circuitry, such as processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry is distributed across multiple separate processors or processing units, for example, multiple of the same type of processing units (e.g., two INTEL CORE i7 processors) or multiple different processors (e.g., an INTEL CORE i5 processor and an INTEL CORE i7 processor). In some embodiments, control circuitry 204 executes instructions suitable to implement any of the techniques described above or below.

Storage 208 may be an electronic storage device that is part of control circuitry 204. As referred to herein, the phrase "electronic storage device" or "storage device" should be understood to mean any device for storing electronic data, computer software, instructions, and/or firmware, such as RAM, content-addressable memory (CAM), hard disk drives (HDDs), optical drives, solid state devices (SSDs), quantum storage devices, or any other suitable fixed or removable storage devices, and/or any combination of the same. The circuitry described herein may execute instructions included in software running on one or more general purpose or specialized processors. In some embodiments, storage 208 may include a table storage for forwarding tables. In some embodiments, storage 208 may include a table storage storing EVPN type-4 routes. Multiple circuits may be provided to handle simultaneous processing functions. In some embodiments, device 200 may be a virtual device, wherein components 204, 206, 208, 202 and 210 are virtualized on top of another physical device.

Figure 3:
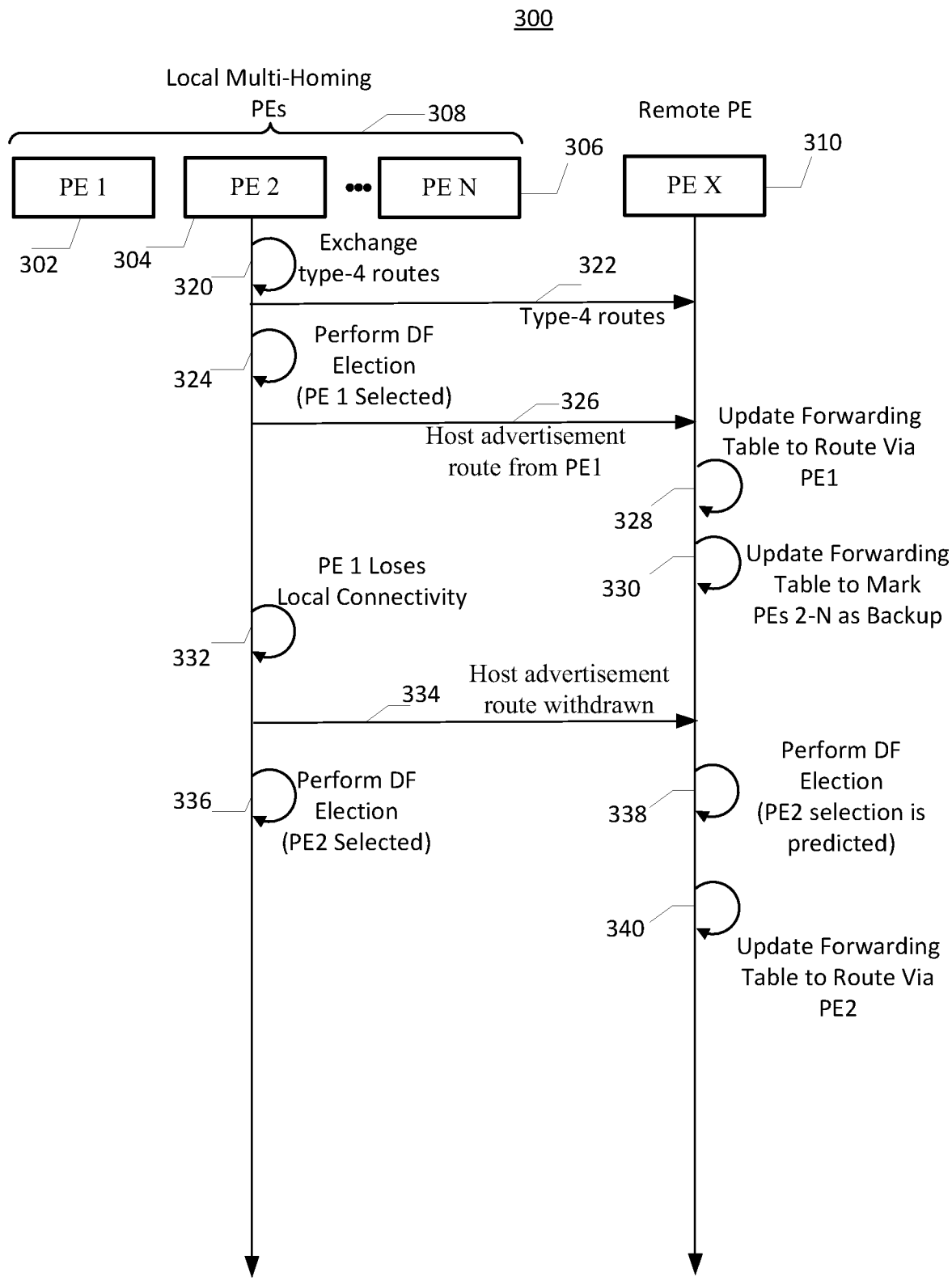
FIG. 3 is a flowchart of an illustrative process for optimizing routing, in accordance with some embodiments of the present disclosure.

FIG. 3 is a flowchart of a detailed illustrative process for optimized routing, in accordance with some embodiments of the present disclosure. Process 300 may be performed by physical or virtual control circuitry, such as control circuitry 204 of device 200 (FIG. 2). For example, process 300 may be performed by control circuitries of devices PEs 108, 110, 112, and 104.

In some embodiments, some steps process 300 may be performed by one of several devices. For example, provider edges 308 may include PE 302, PE 304, PE 306 and any, optionally, any other number of PE devices. For example, PE 302, PE 304, PE 306 may correspond to PEs 108, 110, 112, of FIG. 1B respectively. In some embodiments, provider edges 308 may be configured to provide multihoming services to devices on same local ES in single-active configuration. Additionally, some steps process 300 may be performed by a remote PE 310, that is not directly connected to the same ES for which provider edges 308 provide multihoming.

In some embodiments, process 300 begins when multihoming services is being initially configured. At step 320, provider edges 308 will exchanged EVPN type-4 routes that are used for DF election. EVPN type 4 routes are described in more detail in "BGP MPLS-Based Ethernet VPN" standard as found in https://tools.ietf.org/html/rfc7432, which is herein incorporated by reference in its entirety. The type 4 routes are also sent to other PE's via EVPN core. For example, at step 322 EVPN type 4 routes may be sent to remote PE 310 that is not connected to the ES that is serviced by provider edges 308.

At 324, provider edges 308 perform DF election (e.g., as described in BGP MPLS-Based Ethernet VPN document). As a result, PE 302 may be selected as the designated forwarder among provider edges 308 for serving an ES (e.g., ES 122) in single-active configuration. After the selection, at step 326, PE 302 (which is now the DF) may transmit a host advertisement route to remote PE 310 for every host (e.g., for host 126 of FIG. 1) that is accessible on ES via PE 302. At 328, PE 310 updates its forwarding table for the host of the received host advertisement route to mark PE 302 as the next hop for routing packets to that host. At 330, PE 302 may also add other PEs (e.g., provider edges 304-306) to the forwarding table as backup next hop devices for reaching the host (e.g., for host 126 of FIG. 1). In this way, whenever PE 310 receives a packet destined for the host, it would be routed via PE 302.

At 332, PE 302 may lose connectivity to the ES. In this case, at 334, PE 302 may withdraw host advertisements from PE 310. The loss of connectivity may cause PEs 308 (that still have connectivity to the ES) to rerun DF election algorithm at step 336. As a result of the DF election (that is based on type-4 routes exchanged at step 320), another PE is select as the DF. For example, PE 304 may be selected. Additionally, PE 310, at 338 may also locally perform DF election using type-4 routes received at step 322. Because DF election process is deterministic, PE 310 is also able accurately predict outcome of the DF election performed at step 336. That is, PE 310 is able to accurately predict that PE 304 is selected as DF for the ES. Because, PE 304 is already stored as back-up nexthop, at 340, PE 310 is able to update its table to designate PE 304 as next hop for hosts that are reachable via the ES. For example, PE 310 may switch PE 302 from being the nexthop and designated PE 304 as the next hop. In this way, PE 310 is able to recover from loss of connectivity of 302 without the need to receive a new host advertisement route from PE 304.

Figure 4:
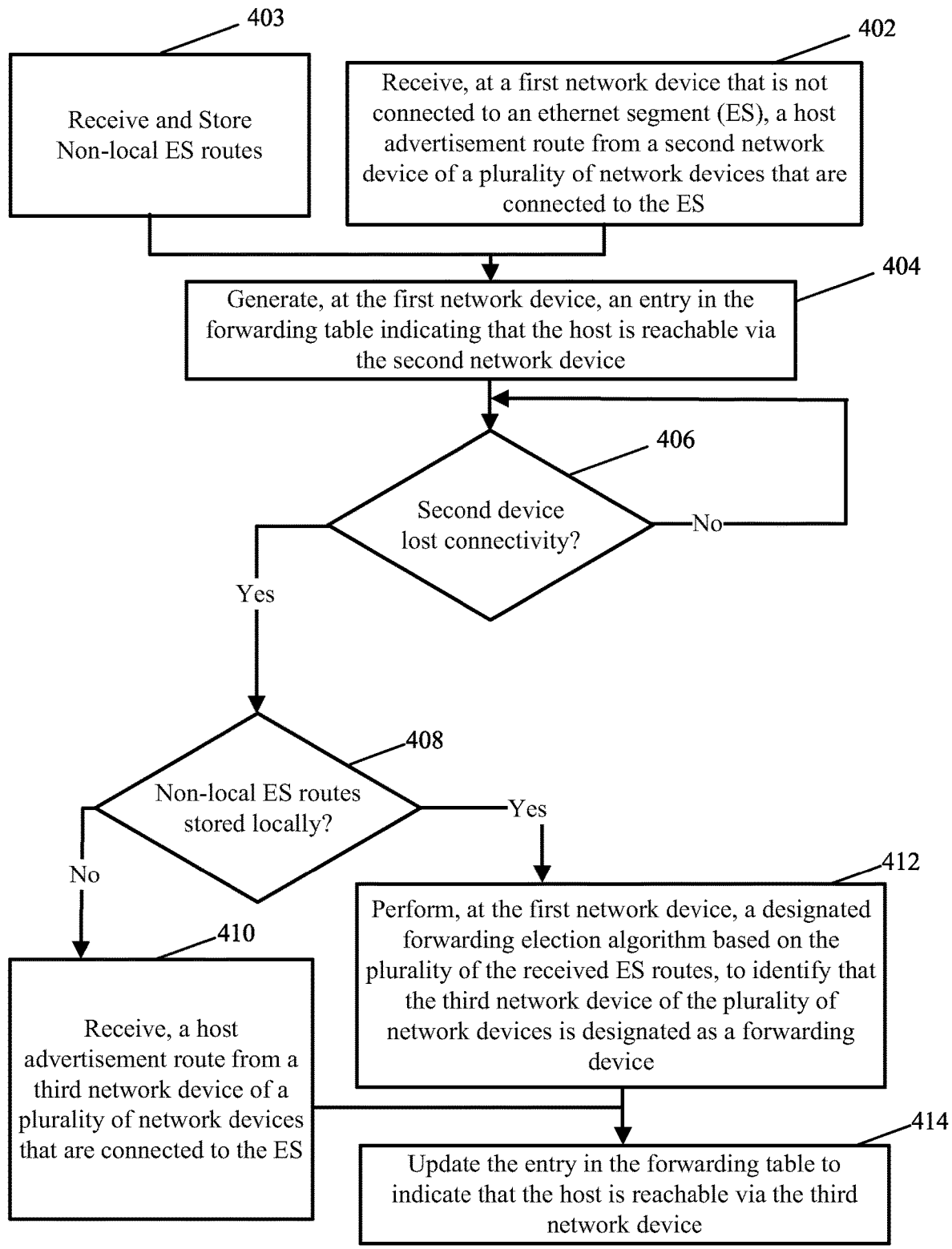
FIG. 4 is another flowchart of an illustrative process for optimizing routing, in accordance with some embodiments of the present disclosure.

FIG. 4 is a flowchart of a detailed illustrative process of modifying a forwarding table (e.g., a MAC table) and using that table for optimized routing, in accordance with some embodiments of the present disclosure. Process 400 may be performed by physical or virtual control circuitry, such as control circuitry 204 of device 200 (FIG. 2). In some embodiments, process 400 is performed by control circuitry of a first device (e.g., PE 104 of FIG. 1).

At 402, the control circuitry of the first device (e.g., control circuitry of PE 104 of FIG. 1) may receive a host advertisement route from a second network device. For example, the control circuitry may receive a host advertisement route for a host (e.g. host 126 of FIG. 1) that is reachable via a remote ES that is serviced by a plurality of network devices configured to provide multihoming in single-active configuration (e.g., PEs 108, 110, and 112 of FIG. 1). In some embodiments, the control circuitry has no direct connection to the ES via the local device.

In some embodiments, the host advertisement route for the host may be received from a second device (e.g., a device of the plurality of network devices connected to the ES that has been designated as the designated forwarder). For example, the designated forwarder may have been selected via DF election algorithm performed by one or more of the plurality of network devices that are connected to the ES. In some implementations, the plurality of network devices connected to the ES may have selected the second device as the DF based on ES routes (e.g., EVPN type-4) routes exchanged between the plurality of network devices connected to the ES.

At 403, the control circuitry may also receive the EVPN type-4 routes exchanged between the plurality of network devices connected to the ES. Normally, such routes would be discarded, however the control circuitry may, instead, store such routes locally even though the control circuitry has no direct connection to the remote ES.

At 404, the control circuitry generates an entry in the forwarding table indicating that the host is reachable via the network device from which the host advertisement route was received. Additionally, the control circuitry may store addresses of other (non-DF) devices of the plurality of network devices connected to the remote ES as "backup." After the forwarding table is configured, whenever a packet is received by the control circuitry that is destined for the host, it will be forwarded by the control circuitry to the network device from which the host advertisement route was received.

At 406, the control circuitry may determine that the second device has lost connectivity to the ES. For example, the control circuitry may receive a request to withdraw the host advertisement route from the second network device. In some embodiments, the control circuitry may identify the loss of connectivity due to inability to reach the host via the second network device. If no loss of connectivity, the control circuitry may continue to monitor for the occurrence of the loss of connectivity event. If loss of connectivity occurred, process 400 continues at 408.

At 408, the control circuitry checks if it has locally stored EVPN-type 4 routes for the ES. If not, the process continues at 410. At 410, the control circuitry will have to wait for receipt of a new advertisement route from a third network device of the plurality of network devices that are connected to the ES before updating its forwarding table (e.g., at step 414). However, this may take a significant amount of time resulting in network disruption. If the locally stored EVPN-type 4 routes for the ES, the control circuitry proceeds to step 412.

At 412, the control circuitry may perform, at the first network device, a designated forwarding election algorithm based on the plurality of the ES routes received at step 403. For example, the control circuitry may perform DF election using all known EVPN routes for the ES, except for routes from the second network device (e.g., the device that is known to have lost connectivity to the ES.) As result of the DF election, the control circuitry will be able to predict which device of the plurality of network devices connected to the ES will selected as the DF. For example, the control circuitry may predict that the third network device will be selected as the new DF. For this reason, at 414, the control circuitry is able to update the entry in the forwarding table to indicate that the host is reachable via the third network device. This may be accomplished from a simple switch of the third network device being indicated as "backup" to being indicated as "active." After the forwarding table is configured, whenever a packet is received by the control circuitry that is destined for the host, it will be forwarded by the control circuitry to the network device which was identified by the local execution of the DF section algorithm based on remote EVPN type-4 routes for the ES.

While the processes 300 and 400 described above illustrate a single iteration of the operations of ES to update and use the forwarding table, those skilled in the art will appreciate that these processes may be iteratively repeated to update and use the forwarding table multiple times. The processes 300 and 400 described above are intended to be illustrative and not limiting. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

It will be apparent to those of ordinary skill in the art that systems and methods involved in the present disclosure may be embodied in a computer program product that includes a non-transitory computer-usable and/or -readable medium. For example, such a non-transitory computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

What is claimed is:

1. A computer-implemented method for providing redundant-link host multihoming in an Ethernet Virtual Private Network (EVPN) environment, the method comprising:
   detecting, by a single-active provider-edge network device, a loss of connectivity to one or more multihomed hosts, the one or more multihomed hosts being reachable via an ethernet segment (ES) through an ES link associated with an ES identifier;
   in response to detecting that the single-active provider-edge network device has lost connectivity to the ES link:
   performing, by the single-active provider-edge network device, a designated forwarding election algorithm to determine a new active provider-edge network device selected from one or more standby provider-edge network devices; and
   updating, at the single-active provider-edge network device, an entry in a forwarding table indicating that the one or more multihomed hosts are reachable by way of the single-active provider-edge network device via the ES link to indicate that the one or more multihomed hosts are reachable by way of the new active provider-edge network device via the ES link.

2. The computer-implemented method of claim 1, further comprising:
   in response to determining that the single-active provider-edge network device has lost connectivity to the one or more ES links:
   performing, by a route-receiving provider-edge network device, the designated forwarding election algorithm to identify the new active provider-edge network device.

3. The computer-implemented method of claim 2, further comprising:
   receiving, at the route-receiving provider-edge network device, one or more response data packets from the one or more multihomed hosts via the new active provider-edge network device.

4. The computer-implemented method of claim 1, further comprising:
   receiving, at the single-active network device, a request data packet addressed to an addressed host in the one or more multihomed hosts; and
   forwarding the data packet addressed via the new active provider-edge network device.

5. The computer-implemented method of claim 1, wherein the single-active provider-edge network device directs network traffic to the one or more multihomed hosts via the new active provider-edge network device.

6. The computer-implemented method of claim 1, wherein the designated forwarding election algorithm is deterministic.

7. The computer-implemented method of claim 2, wherein the active provider-edge network device, the route-receiving provider-edge network device, and the one or more standby provider-edge network devices are each configured as Virtual Tunnel End Points (VTEP).

8. One or more non-transitory computer-readable media storing computer-executable instructions that, when executed by a processor, perform a method of providing redundant-link host multihoming in an Ethernet Virtual Private Network (EVPN) environment, the method comprising:
   detecting, by an active provider-edge network device, a loss of connectivity to one or more multihomed hosts, the one or more multihomed hosts being reachable via an ethernet segment (ES) through an ES link associated with an ES identifier;
   in response to detecting that the active provider-edge network device has lost connectivity to the ES link:
   performing, by the active provider-edge network device, a designated forwarding election algorithm to determine a new active provider-edge network device selected from one or more standby provider-edge network devices; and
   updating, at the active provider-edge network device, an entry in a forwarding table indicating that the one or more multihomed hosts are reachable by way of the active provider-edge network device via the ES link to indicate that the one or more multihomed hosts are reachable by way of the new active provider-edge network device via the ES link.

9. The one or more non-transitory computer-readable media of claim 8, wherein the method further comprises:
   in response to determining that the active provider-edge network device has lost connectivity to the one or more ES links:

performing, by a route-receiving provider-edge network device, the designated forwarding election algorithm to identify the new active provider-edge network device.

10. The one or more non-transitory computer-readable media of claim 9, wherein the method further comprises:
receiving, at the active network device, a request data packet addressed to an addressed host in the one or more multihomed hosts; and
forwarding the data packet addressed via the new active provider-edge network device.

11. The one or more non-transitory computer-readable media of claim 8, wherein the one or more standby provider-edge network devices perform a parallel instance of the designated forwarding election algorithm to determine an identity of the new active provider-edge network device.

12. The one or more non-transitory computer-readable media of claim 8, wherein the designated forwarding election algorithm is deterministic.

13. The one or more non-transitory computer-readable media of claim 8, wherein the active provider-edge network device directs network traffic to the one or more multihomed hosts via the new active provider-edge network device.

14. The one or more non-transitory computer-readable media of claim 9, wherein the active provider-edge network device and the one or more standby provider-edge network devices are each configured as Virtual Tunnel End Points (VTEP).

15. A system providing redundant-link host multihoming in an Ethernet Virtual Private Network (EVPN) environment, the system comprising:
a processor; and
one or more non-transitory computer-readable media storing computer-executable instructions that, when executed by the processor, perform a method comprising:
detecting, by an active redundant provider-edge network device, a loss of connectivity to at least one multihomed host, the at least one multihomed host being reachable via an ethernet segment (ES) through an ES link associated with an ES identifier;
in response to detecting that the active redundant provider-edge network device has lost connectivity to the ES link:
performing, by the active redundant provider-edge network device, a designated forwarding election algorithm to determine a new active provider-edge network device selected from one or more standby provider-edge network devices; and
updating, at the active redundant provider-edge network device, a generated route in a routing table indicating that the at least one multihomed host is reachable by way of the active provider-edge network device via the ES link to indicate that the at least one multihomed host is reachable by way of the new active provider-edge network device via the ES link.

16. The system of claim 15, wherein the method further comprises:
in response to determining that the active redundant provider-edge network device has lost connectivity to the one or more ES links:
performing, by a route-receiving provider-edge network device, the designated forwarding election algorithm to identify the new active provider-edge network device.

17. The system of claim 15, wherein the method further comprises:
receiving, at the active redundant network device, a request data packet addressed to an addressed host in the one or more multihomed hosts; and
forwarding the data packet addressed via the new active provider-edge network device.

18. The system of claim 17, wherein the one or more standby redundant network devices perform a parallel computation of the designated forwarding election algorithm to determine an identity of the new active provider-edge network device.

19. The system of claim 18, wherein the active redundant network device and the one or more standby redundant network devices are each configured as Virtual Tunnel End Points (VTEP).

20. The system of claim 15, wherein the designated forwarding election algorithm is deterministic.

* * * * *